(12) United States Patent
Kim et al.

(10) Patent No.: US 11,404,755 B2
(45) Date of Patent: Aug. 2, 2022

(54) SECONDARY BATTERY

(71) Applicant: LG Chem, Ltd., Seoul (KR)

(72) Inventors: Kyoung Ho Kim, Daejeon (KR); Jung Seok Choi, Daejeon (KR); Song Taek Oh, Daejeon (KR); Jong Pil Park, Daejeon (KR); Kyung Min Kim, Daejeon (KR)

(73) Assignee: LG Energy Solution, Ltd.

( * ) Notice: Subject to any disclaimer, the term of this patent is extended or adjusted under 35 U.S.C. 154(b) by 49 days.

(21) Appl. No.: 16/631,329

(22) PCT Filed: Nov. 9, 2018

(86) PCT No.: PCT/KR2018/013665
§ 371 (c)(1),
(2) Date: Jan. 15, 2020

(87) PCT Pub. No.: WO2019/103372
PCT Pub. Date: May 31, 2019

(65) Prior Publication Data
US 2020/0212416 A1 Jul. 2, 2020

(30) Foreign Application Priority Data
Nov. 24, 2017 (KR) .................. 10-2017-0158265

(51) Int. Cl.
*H01M 50/578* (2021.01)
*H01M 50/172* (2021.01)
(Continued)

(52) U.S. Cl.
CPC ....... *H01M 50/578* (2021.01); *H01M 50/105* (2021.01); *H01M 50/172* (2021.01);
(Continued)

(58) Field of Classification Search
CPC ............... H01M 50/578; H01M 50/10; H01M 50/172; H01M 50/183; H01M 50/531;
(Continued)

(56) References Cited

U.S. PATENT DOCUMENTS

| 6,074,777 A | 6/2000 | Reimers et al. |
| 2011/0104520 A1 | 5/2011 | Ahn |

(Continued)

FOREIGN PATENT DOCUMENTS

| CN | 104081578 A | 10/2014 |
| CN | 104733684 A | 6/2015 |

(Continued)

OTHER PUBLICATIONS

Erol Sancaktar and Lan Bai; Department of Polymer Engineering, The University of Akron, "Electrically Conductive Epoxy Adhesives", Polymers, 3, 427-466; ISSN 2073-4360; www.mdpi.com/journal/polymers; doi:10.3390/polym3010427 (Year: 2011).*

(Continued)

*Primary Examiner* — Matthew T Martin
*Assistant Examiner* — Jessie L. Walls
(74) *Attorney, Agent, or Firm* — Lerner, David, Littenberg, Krumholz & Mentlik, LLP

(57) ABSTRACT

A secondary battery comprises: a pouch; an electrode assembly mounted within the pouch and having a structure in which electrodes and separators are alternately laminated, the electrode assembly having a tab connection part in which electrode tabs extending from ends of the electrodes overlap each other; a lead comprising a first lead having one end electrically connected to the tab connection part and a second lead having one end electrically connected to the first lead and the other end extending outside of the pouch, each of the first lead and the second lead being fixed to respective portions of an inner surface of the pouch; an adhesion unit (Continued)

mechanically and electrically coupling the first lead and the second lead to each other; and a high-voltage decomposition material that is configured to generate a gas when a high voltage having a predetermined level or more is applied to the adhesion unit.

8 Claims, 5 Drawing Sheets

(51) Int. Cl.
*H01M 50/183* (2021.01)
*H01M 50/531* (2021.01)
*H01M 50/195* (2021.01)
*H01M 50/178* (2021.01)
*H01M 50/574* (2021.01)
*H01M 50/572* (2021.01)
*H01M 50/105* (2021.01)
*H01M 50/10* (2021.01)
*H01M 50/19* (2021.01)
*H01M 50/116* (2021.01)
*H01M 50/543* (2021.01)
*H01M 50/198* (2021.01)
*H01M 50/55* (2021.01)

(52) U.S. Cl.
CPC ....... *H01M 50/178* (2021.01); *H01M 50/183* (2021.01); *H01M 50/195* (2021.01); *H01M 50/531* (2021.01); *H01M 50/572* (2021.01); *H01M 50/574* (2021.01); *H01M 50/116* (2021.01); *H01M 50/198* (2021.01); *H01M 50/543* (2021.01); *H01M 50/55* (2021.01); *H01M 2200/20* (2013.01)

(58) Field of Classification Search
CPC ............. H01M 50/116; H01M 50/543; H01M 2200/20; H01M 50/571; H01M 50/572; H01M 50/195; H01M 50/178; H01M 50/55; H01M 50/198; H01M 50/105; H01M 50/574; Y02E 60/10
See application file for complete search history.

(56) References Cited

U.S. PATENT DOCUMENTS

| | | |
|---|---|---|
| 2013/0344379 A1 | 12/2013 | Yang et al. |
| 2015/0004448 A1 | 1/2015 | Morita et al. |
| 2015/0180013 A1 | 6/2015 | Ahn et al. |
| 2015/0333323 A1 | 11/2015 | Umeyama et al. |
| 2016/0172657 A1 | 6/2016 | Matsui et al. |
| 2016/0211502 A1 | 7/2016 | Choi et al. |
| 2017/0125786 A1* | 5/2017 | Park .................... H01M 50/581 |
| 2018/0053976 A1 | 2/2018 | Park et al. |
| 2019/0267578 A1* | 8/2019 | Lee ..................... H01M 50/105 |

FOREIGN PATENT DOCUMENTS

| | | | | |
|---|---|---|---|---|
| CN | 106654137 A | | 5/2017 | |
| JP | H11162512 A | | 6/1999 | |
| JP | 2002008629 A | | 1/2002 | |
| JP | 2016081681 A | * | 5/2016 | ........ H01M 10/0585 |
| JP | 2016081681 A | | 5/2016 | |
| KR | 20100109605 A | | 10/2010 | |
| KR | 20110048470 A | | 5/2011 | |
| KR | 20120139590 A | | 12/2012 | |
| KR | 20130089375 A | | 8/2013 | |
| KR | 20130089375 A | * | 8/2013 | .......... H01M 50/543 |
| KR | 101404704 B1 | | 6/2014 | |
| KR | 20140116940 A | | 10/2014 | |
| KR | 20140147412 A | | 12/2014 | |
| KR | 101595607 B1 | | 2/2016 | |
| KR | 20160125920 A | | 11/2016 | |
| KR | 101704162 B1 | | 2/2017 | |
| KR | 101734703 B1 | | 5/2017 | |
| WO | 2013111291 A1 | | 8/2013 | |

OTHER PUBLICATIONS

Extended European Search Report including Written Opinion for Application No. EP18880825.7, dated Jul. 14, 2020, pp. 1-8.
International Search Report for PCT/KR2018/013665 dated Feb. 15, 2019.
Chinese Search Report for Application No. 201880043100.9 dated Nov. 11, 2021, 3 pages.
Deng, S. "Chemical Formulation and Process Manual", Shanghai Science and Technology Literature Publishing House, Jan. 2003, pp. 81-82.

* cited by examiner

SECONDARY BATTERY

CROSS-REFERENCE TO RELATED APPLICATION

The present application is a national phase entry under 35 U.S.C. § 371 of International Patent Application No. PCT/KR2018/013665, filed on Nov. 9, 2018, published in Korean, which claims priority from Korean Patent Application No. 10-2017-0158265, filed on Nov. 24, 2017, the disclosures of which are hereby incorporated herein by reference in their entireties.

TECHNICAL FIELD

The present invention relates to a secondary battery in which an electrode assembly and an electrolyte are built in a pouch, and more particularly, to a secondary battery in which an operation time of a current interrupt device (CID) is reduced to more improve safety.

BACKGROUND ART

Secondary batteries, which are widely used in various digital devices and transport means such as vehicles are repeatedly chargeable and dischargeable. Also, research and development are continuously carried out to increase efficiency and improve safety. That is, secondary batteries applied to various fields such as notebook computers, mobile phones, and vehicles have to be secured in safety as well as performance.

However, as the secondary battery has high-capacity/high-energy, safety may be more vulnerable. Thus, when a product is developed, the development is carried out with emphasis on safety. Particularly, when the secondary battery is overcharged, a risk of ignition may occur. Thus, prevention of the overcharge may be an important consideration in safety design.

Thus, various additives and anti-ignition materials are added to the electrolyte to improve the safety at a cell level, thereby previously preventing possibility of ignition due to overcharging.

Also, a current interrupt device (CID) is built in the secondary battery (or provided in the secondary battery) to operate when an internal pressure increases in an overcharging state, thereby interrupting supply of current.

That is, as illustrated in FIGS. 1A and 1B, an electrode assembly 30 and an electrolyte are built in a pouch 10. A tab connection part 31 of the electrode assembly 30 is manufactured to be connected to the outside through leads 21 and 22, and current is charged and discharged through the leads 21 and 22.

Each of the leads may have a structure that is inserted into a sealing part formed along a circumference of the pouch 10, i.e., a structure to which the CID is applied. The lead comprises a first lead 21 having one end connected to the tab connection part 31 and a second lead 22 having one end connected to the first lead and the other end extending to the outside of the pouch 10. Each of the first lead 21 and the second lead 22 adheres to an inner surface of the sealing part through a second adhesion unit 50, and a portion of the each of the first and second leads 21 and 22 adheres through an adhesive 60.

Also, when an internal pressure of the pouch 10 increases due to the overcharging (i.e., the electrolyte is evaporated by the overcharging to allow the pouch to swell), the connection portion at which the first lead 21 and the second lead 22 are connected to each other by the adhesive 60 in the state of being fixed to the inner surface of the sealing part is broken to interrupt the current supply (see a broken state of FIG. 3).

However, even if a battery not ignited during the overcharging, if heat of the battery is not properly dissipated, safety with respect to the overcharging may be deteriorated. Thus, even though the above-described CID structure is applied, it is required to prevent the overcharging at a low status of charging (SOC).

DISCLOSURE OF THE INVENTION

Technical Problem

Therefore, a main object of the prevent invention is to provide a secondary battery that is capable of reducing possibility of occurrence of ignition by advancing a separation time of a first lead and a second lead so that, even if a CID is applied, an operation time of the CID is delayed (the first lead and the second lead are separated from each other later) to prevent the ignition from occurring.

Technical Solution

To achieve the above object, a secondary battery according to the present invention comprises: a pouch; an electrode assembly mounted within the pouch and having a structure in which electrodes and separators are alternately laminated, the electrode assembly having a tab connection part in which electrode tabs extending from ends of the electrodes overlap each other and are gathered at one side of the electrode assembly; a lead comprising a first lead having one end electrically connected to the tab connection part and a second lead having one end electrically connected to the first lead and the other end extending to an outside of the pouch, each of the first lead and the second lead being fixed to respective portions of an inner surface of the pouch; an adhesion unit having electrical conductivity and mechanically and electrically coupling the first lead and the second lead to each other; and a high-voltage decomposition material that is configured to generate a gas when a high voltage having a predetermined level or more is applied to the adhesion unit.

The adhesion unit according to the present invention may comprise: metal particles imparting electrical conductivity to the adhesion unit; an adhesion material imparting an adhesive property to the adhesion unit; and the high-voltage decomposition material.

In an embodiment of the present invention, the high-voltage decomposition material may comprise a polymer that is configured to decompose at the high voltage. The polymer may be a material containing a fluorine-substituted aromatic compound. Alternatively, the high-voltage decomposition material may be a material containing $Li_2CO_3$.

Also, the high-voltage decomposition material may be contained in a range of 0.1 wt % to 5 wt % of the adhesion unit, the metal particles may be contained in a range of 20 wt % to 90 wt % of the adhesion unit, and the adhesion material may be contained in a range of 5 wt % to 40 wt % of the adhesion unit.

In another embodiment of the present invention, the high-voltage decomposition material may be contained in a second adhesion unit fixing the first lead and the second lead to the respective portions of the inner surface of the pouch. However, here, the high-voltage decomposition material contained in the second adhesion unit may be set within a range in which the second adhesion unit has adhesion force between the leads and the inner surface of the pouch greater than an adhesion force of the adhesion unit between the first and second leads.

Advantageous Effects

According to the present invention having the above-described structure, when the high voltage is inputted due to the overcharging, the high-voltage decomposition material may be discomposed to additionally generate the gas and thereby to more quickly interrupt the current supply when compared to the related art, thereby more reducing the possibility of the ignition.

MODE FOR CARRYING OUT THE INVENTION

Figure 1A:
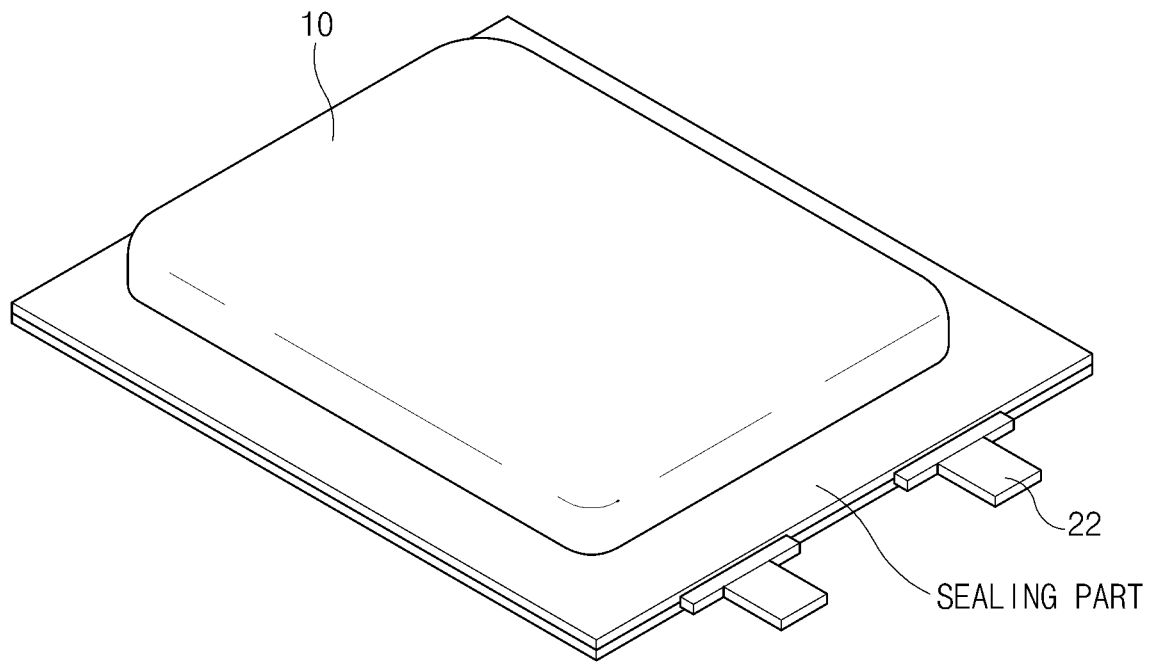
FIG. 1A is a perspective view illustrating an external appearance of a general pouch type secondary battery.
Figure 1B:
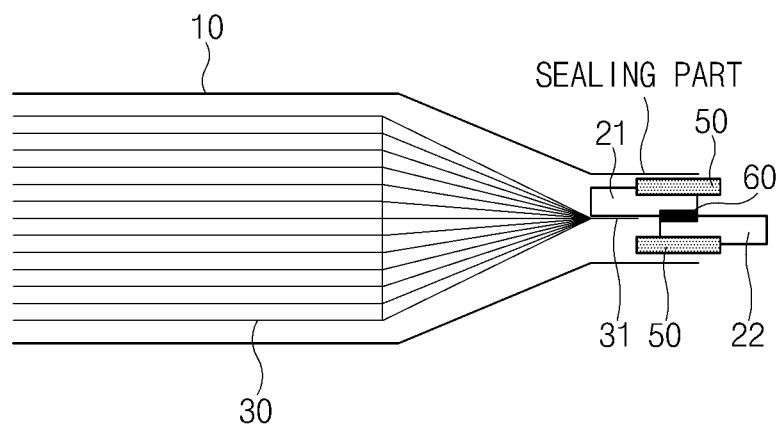
FIG. 1B is a cross-sectional view illustrating a configuration in which a CID is provided on a sealing part of the pouch type secondary battery of FIG. 1A.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly illustrate the present invention, parts that are not related to the description are omitted, and the same or similar components are denoted by the same reference numerals throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a secondary battery in which an electrode assembly 30 and an electrolyte are built in a pouch 10, a sealing part is formed along a circumference of the pouch 10, and the electrode assembly 30 is electrically connected to the outside through a lead passing through the sealing part to perform charging/discharging. Hereinafter, embodiments of the present invention will be described in more detail with reference to the accompanying drawings.

Embodiment 1

Figure 2:
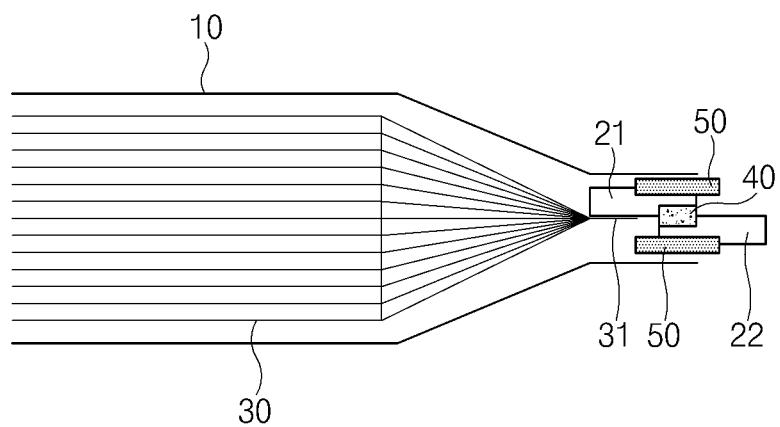
FIG. 2 is a cross-sectional view illustrating a configuration in which the CID is provided according to a preferred embodiment of the present invention.
Figure 3:
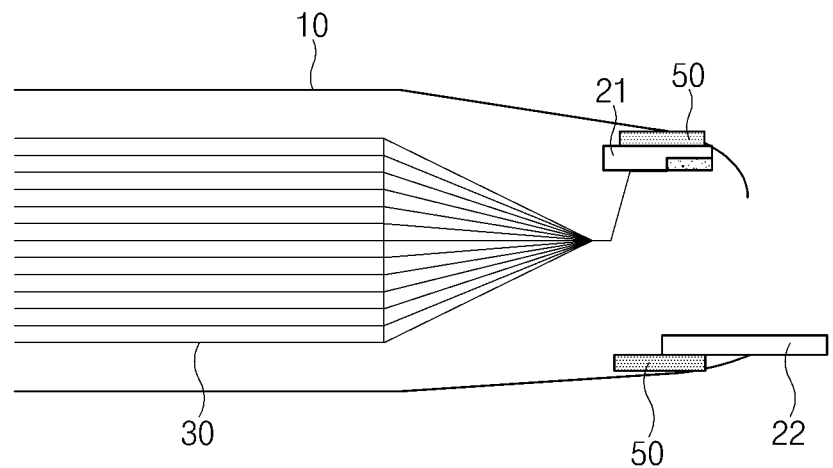
FIG. 3 is a cross-sectional view illustrating a state in which the CID operates (a first lead and a second lead are separated from each other) in the structure of FIG. 2 to interrupt current supply.

Referring to FIGS. 2 and 3, a secondary battery according to an embodiment of the present invention has a structure to which a current interrupt device (CID) is applied. That is, a lead is configured so that a first lead 21 and a second lead 22 are connected to each other. Here, the connection between the first lead 21 and the second lead 22 is broken when an internal pressure increases.

An electrode assembly 30 built in a pouch 10 together with an electrolyte has a structure in which electrodes (a negative electrode and a positive electrode) and separators are alternately laminated. A top connection part 31 in which electrode tabs expanded from ends of the electrodes overlap each other to be gathered to one side is formed.

The tab connection part 31 adheres to one end of the first lead 21, and the other end of the first lead 21 is connected to one end of the second lead 22 through an adhesion unit 40. Also, the other end of the second lead 22 is exposed to the outside of the sealing part of the pouch 10. Here, a top surface of the first lead 21 adheres to an inner surface of an upper portion of the sealing part of the pouch 10 through a second adhesion unit 50, and a bottom surface of the second lead 22 adheres to an inner surface of a lower portion of the sealing part of the pouch 10 through a second adhesion unit 50. The second adhesion unit 50 has adhesion force greater than that of an adhesion unit 40 through which the first lead 21 and the second lead 22 are attached to each other (that is, adhesion force at which the first lead and the second lead are coupled to each other is less than that at which each of the first lead and the second lead adheres to the inner surface of the pouch).

Also, the adhesion unit 40 applied to attach the first lead 21 and the second lead 22 to each other may have conductivity so that current flow is allowed. Thus, the electrode assembly 30 may have a structure that is capable of charging/discharging electricity into/from the outside of the pouch 10 through the first lead 21 and the second lead 22. When a gas pressure within the pouch 10 increases to be expanded (by decomposition of the electrolyte and generation of heat of the battery due to an increase in voltage by the overcharging), the first lead 21 and the second lead 22 may be separated from each other to interrupt the electrical connection of the electrode assembly 30.

Here, in this embodiment, the adhesion unit 40 contains a high-voltage decomposition material that is decomposed to generate a gas when a high voltage that is equal to or greater than a predetermined level is applied so that the increase of the gas pressure is accelerated to advance an operation time of the CID (so that the first lead and the second lead are more quickly broken).

Figure 4:
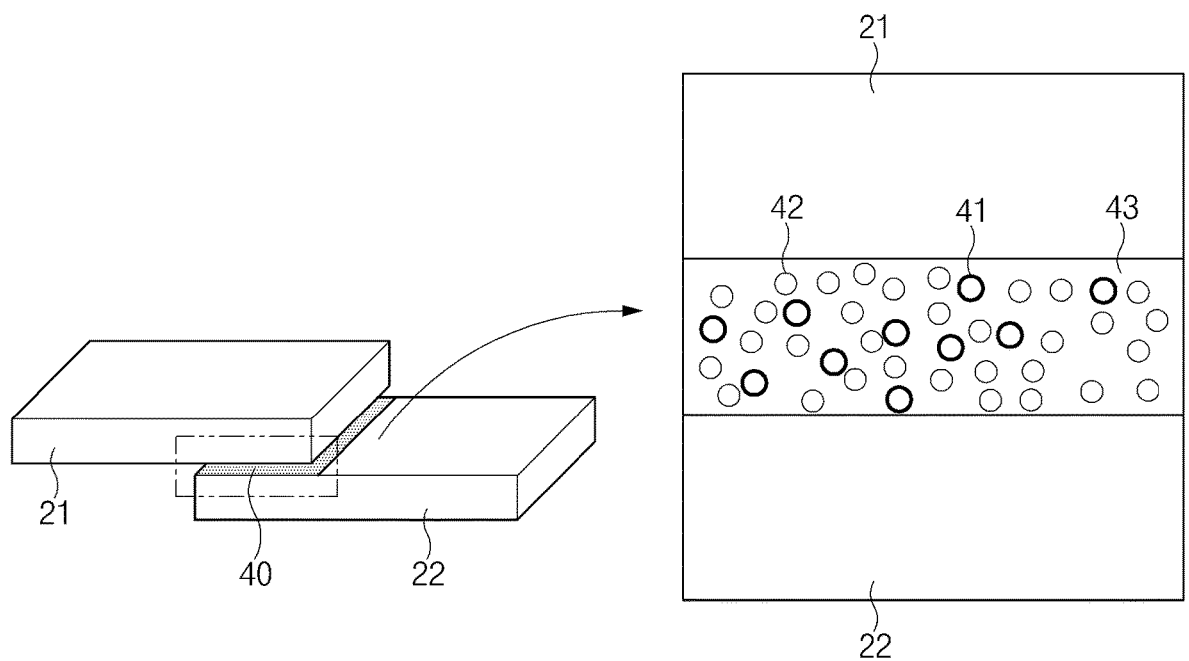
FIG. 4 is an enlarged side view of a portion at which the first lead and the second lead are connected to each other.

That is, as illustrated in FIG. 4, the adhesion unit 40 contains metal particles 42 imparting conductivity, an adhesion material 43 imparting an adhesive property, and a high-voltage decomposition material 41 that is decomposed to generate a gas when a high voltage is applied.

In this embodiment, the high-voltage decomposition material 41 may be a polymer that is decomposed at a high voltage. The polymer may be a material containing a fluorine-substituted aromatic compound. Alternatively, the high-voltage decomposition material 41 may be a material containing $Li_2CO_3$.

If the adhesion material 43 itself has adequate conductivity, the metal particles 42 may not be added. However, it is preferable to additionally put an appropriate amount of metal particles 42 so that the conductivity increases to reduce resistance.

In this embodiment, the adhesion unit 40 may content the metal particles 42 in the range of 20 wt % to 90 wt % and the adhesion material in the range of 5 wt % to 40 wt %. Also, the high-voltage decomposition material 41 is preferably contained in the range of 0.1 wt % to 5 wt %.

As an amount of high-voltage decomposition material 41 increases, an amount of gas to be generated may increase to more quickly separate the first lead 21 and the second lead 22 from each other. However, the more an amount of high-voltage decomposition material 41 increases, the more an amount of adhesion material 43 and/or metal particles 42 decreases. Thus, it is preferable that the materials are added in the above ranges.

That is, when an amount of adhesion material 43 decreases, the bonding force between the first lead 21 and the second lead 22 may decrease. When an amount of metal particles 42 decreases, the conductivity may be deteriorated to increase in resistance. Thus, it is preferable that the high-voltage decomposition material 41 is contained in the range of 0.1 wt % to 5 wt % in consideration of such a point.

TABLE 1

|  | Comparison | Test 1 | Test 2 | Test 3 | Test 4 | Test 5 |
|---|---|---|---|---|---|---|
| High-voltage decomposition material (wt %) | 0 | 0.05 | 0.1 | 1 | 5 | 10 |
| Resistance of second lead (mohm) | 0.14 | 0.14 | 0.15 | 0.16 | 0.19 | 0.31 |
| Total initial resistance (%) | 100 | 100 | 101 | 102 | 105 | 116 |
| Adhesion force between first lead and second lead (kgf/cm) | 3.0 | 3.0 | 2.9 | 2.7 | 2.1 | 1.3 |
| Overcharging result (Pass when short-circuit between first lead and second lead occurs) | Fail | Fail | Pass | Pass | Pass | Pass |

Table 1 above is a table showing results obtained by comparing an increase/decrease of resistance and adhesion according to a content of $Li_2CO_3$ that is the high-voltage decomposition material 41, which is added to the adhesion unit 40.

As shown in Table 1, when the high-voltage decomposition material 41 is contained at an amount of 0.1 wt % or more in the adhesion unit 40, all the CID operation tests pass. However, as a content of the high-voltage decomposition material 41 increases, it is seen that resistance generated in the second lead 22 and total resistance of the battery gradually increase, and adhesion force between the first lead 21 and the second lead 22 gradually decreases.

Thus, in this embodiment, it is preferable that the high-voltage decomposition material 41 is contained in the range of 0.1 wt % to 5 wt % in the adhesion unit 40 in consideration of the adhesion force between the first lead 21 and the second lead 22 and an amount of heat generated by the increase in resistance.

Embodiment 2

In another embodiment of the present invention, the second adhesion unit 50 for fixing the first lead 21 and the second lead 22 to the pouch 10 may also contain the high-voltage decomposition material 41.

That is, when the high-voltage decomposition material 41 is contained in the second adhesion unit 50 as well as the adhesion unit 40, a content of high-voltage decomposition material 41 contained in the adhesion unit 40 may be reduced to solve the problems due to the decrease of the adhesion force and the increase of the resistance.

However, here, the high-voltage decomposition material 41 contained in the second adhesion unit 50 is set within a range in which the second adhesion unit 50 has adhesion force greater than that of the adhesion unit 40.

According to the present invention having the above-described structure, when the high voltage is inputted due to the overcharging, the high-voltage decomposition material 41 may be discomposed to additionally generate the gas and thereby to more quickly interrupt the current supply when compared to the related art, thereby more reducing the possibility of the ignition.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
a pouch;
an electrode assembly mounted within the pouch and having a structure in which electrodes and separators are alternately laminated, the electrode assembly having a tab connection part in which electrode tabs extending from ends of the electrodes overlap each other and are gathered at one side of the electrode assembly;
a lead comprising a first lead having one end electrically connected to the tab connection part and a second lead having one end electrically connected to the first lead and the other end extending to an outside of the pouch, each of the first lead and the second lead being fixed to respective portions of an inner surface of the pouch;
a first adhesion unit having electrical conductivity and mechanically and electrically coupling the first lead and the second lead to each other;
a second adhesion unit fixing the first lead and the second lead to the respective portions of the inner surface of the pouch; and
a decomposition material that is configured to generate a gas when a high voltage having a predetermined level or more is applied to the adhesion unit,
wherein the first adhesion unit is a single layer of material that includes metal particles imparting electrical conductivity to the single layer of material, particles of an adhesion material imparting an adhesive property to the single layer of material, and particles of the decomposition material,
wherein the decomposition material is contained in the second adhesion unit fixing the first lead and the second lead to the respective portions of the inner surface of the pouch, wherein the decomposition material contained in the second adhesion unit is configured such that the second adhesion unit has an adhesion force between the first lead and the second lead and the respective portions of the inner surface of the pouch greater than an adhesion force of the first adhesion unit between the first lead and the second lead, and wherein the first adhesion unit and the second adhesion unit are each disposed within a sealing part of the pouch.

2. The secondary battery of claim 1, wherein the decomposition material comprises a polymer that is configured to decompose at the high voltage.

3. The secondary battery of claim 2, wherein the polymer comprises a material containing a fluorine-substituted aromatic compound.

4. The secondary battery of claim 1, wherein the decomposition material comprises a material containing $Li_2CO_3$.

5. The secondary battery of claim 1, wherein the decomposition material is contained in a range of 0.1 wt % to 5 wt % of the adhesion unit.

6. The secondary battery of claim 1, wherein the metal particles are contained in a range of 20 wt % to 90 wt % of the adhesion unit.

7. The secondary battery of claim 1, wherein the adhesion material is contained in a range of 5 wt % to 40 wt % of the adhesion unit.

8. The secondary battery of claim 1, wherein the secondary battery is configured such that, when the pouch is expanded due to an increase of a gas pressure within the pouch, the first lead and the second lead are separated from each other, and the decomposition material is decomposed to generate the gas when the high voltage having the predetermined level or more is applied to accelerate the increase of the gas pressure.

* * * * *